(12) United States Patent
Ringenberger

(10) Patent No.: US 8,496,821 B2
(45) Date of Patent: Jul. 30, 2013

(54) SYSTEMS AND METHODS FOR FILTERING FUEL

(75) Inventor: Rhett Dakota Ringenberger, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 1613 days.

(21) Appl. No.: 12/003,526

(22) Filed: Dec. 28, 2007

(65) Prior Publication Data
US 2009/0166301 A1 Jul. 2, 2009

(51) Int. Cl.
*B01D 27/08* (2006.01)
*B01D 27/14* (2006.01)
*B01D 29/56* (2006.01)
*B01D 29/58* (2006.01)

(52) U.S. Cl.
USPC ........... 210/232; 210/314; 210/316; 210/437; 210/456; 210/416.4

(58) Field of Classification Search
None
See application file for complete search history.

(56) References Cited

U.S. PATENT DOCUMENTS

| 3,390,778 | A |   | 7/1968  | Uhen |
|-----------|---|---|---------|------|
| 3,809,244 | A |   | 5/1974  | Jackson |
| 3,945,923 | A |   | 3/1976  | Rogers et al. |
| 4,014,794 | A | * | 3/1977  | Lewis ........................... 210/199 |
| 4,695,377 | A |   | 9/1987  | Medley, III |
| 4,802,979 | A |   | 2/1989  | Medley, III |
| 5,017,285 | A |   | 5/1991  | Janik et al. |
| 5,084,170 | A |   | 1/1992  | Janik et al. |
| 5,151,180 | A |   | 9/1992  | Giordano et al. |
| 5,203,994 | A |   | 4/1993  | Janik |
| 5,236,579 | A |   | 8/1993  | Janik et al. |
| 5,372,115 | A |   | 12/1994 | Straub et al. |
| 5,766,463 | A |   | 6/1998  | Janik et al. |
| 5,766,468 | A |   | 6/1998  | Brown et al. |
| 5,958,237 | A |   | 9/1999  | Cort et al. |
| 6,481,580 | B1|   | 11/2002 | Amstutz et al. |
| 7,163,003 | B2|   | 1/2007  | Bradford |
| 7,273,041 | B2|   | 9/2007  | Larsson et al. |
| 2009/0166301 | A1 | * | 7/2009 | Ringenberger ............... 210/767 |

\* cited by examiner

*Primary Examiner* — Robert James Popovics
(74) *Attorney, Agent, or Firm* — Finnegan, Henderson, Farabow, Garrett & Dunner LLP

(57) ABSTRACT

The present disclosure is directed to a capsule configured to direct fuel flow within a fuel filter assembly housing. The capsule has a tubular element configured to define a flow path between the capsule and a fuel filter assembly housing. The tubular element defines an interior chamber, a proximal end, and a distal end defining a manifold. The tubular element is configured to be removably received by the fuel filter assembly housing. The interior chamber is configured to receive a fuel filter element. The capsule is configured to direct fuel flow from the proximal end of the capsule, around the tubular element, to a point beyond the distal end of the capsule, and to receive fuel flow from the point beyond the distal end of the capsule and direct the fuel flow via the manifold to the filter element, thereby providing at least two passes of the fuel flow through filter elements within the fuel filter assembly housing.

19 Claims, 3 Drawing Sheets

SYSTEMS AND METHODS FOR FILTERING FUEL

TECHNICAL FIELD

This disclosure relates generally to systems and methods for filtering fuel, and more particularly, to systems and methods for providing serial fuel filtration within a housing.

BACKGROUND

Engines, including compression-ignition engines, spark-ignition engines, gasoline engines, gaseous fuel-powered engines, and other internal combustion engines, may operate more effectively with fuel from which contaminates have been removed prior to the fuel reaching a combustion chamber of the engine. In particular, fuel contaminates, if not removed, may lead to undesirable operation of the engine and/or may increase the wear rate of engine components, such as, for example, fuel system components.

Effective removal of contaminates from the fuel system of a compression-ignition engine may be particularly important. In some compression-ignition engines, air is compressed in a combustion chamber, thereby increasing the temperature and pressure of the air such that when fuel is supplied to the combustion chamber, the fuel and air ignite. If water and/or other contaminates are not removed from the fuel, the contaminates may interfere with and/or damage, for example, fuel injectors, which may have orifices manufactured to exacting tolerances and shapes for improving the efficiency of combustion and/or reducing undesirable exhaust emissions. Moreover, the presence of water in the fuel system may cause considerable engine damage and/or corrosion in the injection system.

Fuel filtration systems serve to remove contaminates from the fuel. For example, some conventional fuel systems may include a primary fuel filter, which removes water and large particulate matter, and a secondary fuel filter which removes a significant portion of remaining particulate matter (e.g., smaller contaminates) such as fine particulate matter. In particular, a typical secondary filter may include multiple filter elements contained within in a high-pressure-resistant housing. The multiple filter elements may be arranged within the housing, such that a given volume of fuel is filtered by only one of the multiple filter elements within the housing. Thus, in a system including a primary filter and a secondary filter, a given volume of fuel is filtered via filtration media twice—once in the primary filter where water and relatively large particulate matter may be removed, and once in the secondary filter where relatively small particulate matter may be removed. In some systems, attempts to improve the effectiveness of filtration systems have resulted in providing additional, separate fuel filters to supplement the primary and secondary fuel filters. The addition of such supplemental fuel filters, however, may be undesirable due, for example, to space and/or packaging constraints associated with the environment of the engine, which may render adding supplemental fuel filters problematic.

One attempt to combine primary and secondary fuel filters in a single housing is described in U.S. Pat. No. 3,390,778 ("the '778 patent") issued to Uhen on Jul. 2, 1968. Specifically, the '778 patent discloses a two-stage throw-away type filter unit having first and second vertically stacked annular filter elements. The elements are disposed in a series flow relationship with the lowermost element being adapted to separate water from a fuel, which is also filtered by each of the elements. Although the two-stage filter assembly described in the '778 patent may benefit from vertically stacking the two filter elements, the '778 patent does not provide additional filtration relative to systems including separate primary and secondary filters.

The present disclosure may be directed to overcoming or mitigating one or more of the problems set forth above.

SUMMARY

In one aspect, the present disclosure is directed to a capsule configured to direct fuel flow within a fuel filter assembly housing. The capsule may include a tubular element configured to define a flow path between the capsule and a fuel filter assembly housing. The tubular element defines an interior chamber, a proximal end, and a distal end defining a manifold. The tubular element is configured to be removably received by the fuel filter assembly housing. The interior chamber is configured to receive a fuel filter element. The capsule is configured to direct fuel flow from the proximal end of the capsule, around the tubular element, to a point beyond the distal end of the capsule, and to receive fuel flow from the point beyond the distal end of the capsule and direct the fuel flow via the manifold to the filter element, thereby providing at least two passes of the fuel flow through filter elements within the fuel filter assembly housing.

An additional aspect of the present disclosure is directed to a fuel filter assembly including a housing defining an inlet port and an outlet port proximate a first end of the housing. The fuel filter assembly may include a first filter element received within the housing proximate a second end of the housing. The fuel filter assembly may also include a capsule received within the housing between the first filter element and the first end of the housing, and a second filter element received within the capsule. The capsule may be configured to direct fuel flow serially through the first filter element and the second filter element.

DETAILED DESCRIPTION

Figure 1:
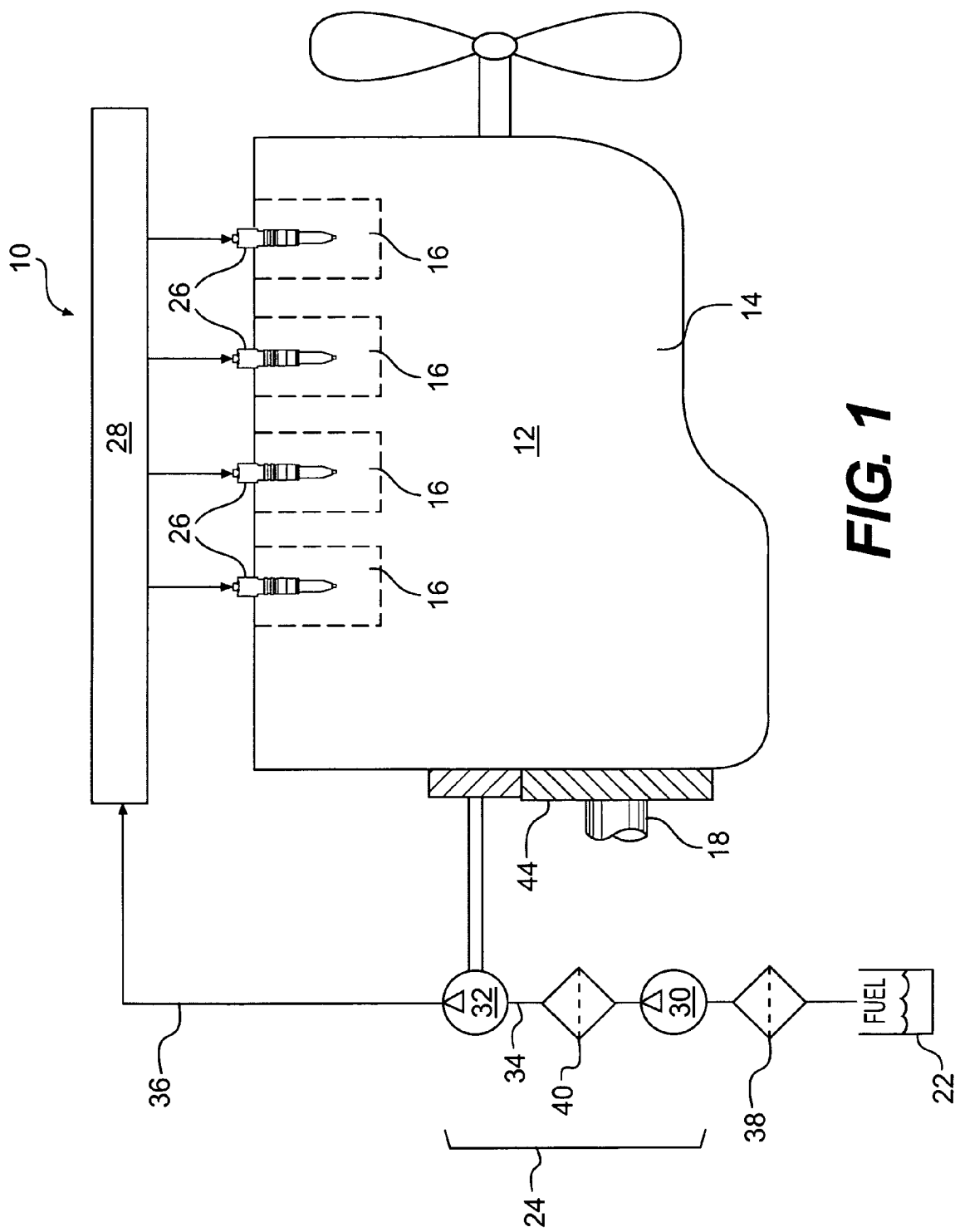
FIG. 1 is a schematic illustration of an exemplary embodiment of a power system.

FIG. 1 illustrates an exemplary embodiment of a power system 10 configured to convert fuel and air into mechanical work. Power system 10 includes an engine 12 (e.g., a four-stroke compression-ignition engine). One skilled in the art will recognize that engine 12 may be any type of internal combustion engine, such as, for example, a spark-ignition engine, a gasoline engine, or a gaseous fuel-powered engine. Engine 12 may include a block 14 that at least partially defines a plurality of combustion chambers 16. As shown in FIG. 1, exemplary engine 12 includes four combustion chambers 16. It is contemplated that engine 12 may include a greater or lesser number of combustion chambers 16, and that combustion chambers 16 may be disposed in any configuration, such as, for example, in an "in-line" configuration, a "V" configuration, or any other known configuration. Engine 12 may include a crankshaft 18 that is rotatably disposed within block 14. Connecting rods (not shown) may connect a plurality of pistons (not shown) to crankshaft 18, so that combustion within a combustion chamber 16 results in a sliding motion of each piston within a respective combustion chamber 16, which, in turn, results in rotation of crankshaft 18, as is conventional in a reciprocating-piston engine.

Power system 10 may include a fuel system 20 configured to deliver injections of pressurized fuel into each of combustion chambers 16 according to a timing scheme resulting in coordinated combustion within combustion chambers 16. For example, fuel system 20 may be a common rail system and may include a tank 22 configured to hold a supply of fuel, and a fuel pumping arrangement 24 configured to flow and/or pressurize the fuel and direct the fuel to a plurality of fuel injectors 26 associated with the combustion chambers 16 via a flow path 28 (e.g., a fuel rail).

For example, pumping arrangement 24 may include one or more pumping devices configured to increase the pressure of the fuel and direct one or more pressurized streams of fuel to flow path 28. According to some embodiments, pumping arrangement 24 may include a low pressure pump 30 and a high pressure pump 32 disposed in series and fluidly connected by way of a fuel line 34. Low pressure pump 30 may include a transfer pump that provides a low pressure fuel feed to high pressure pump 32. High pressure pump 32 may receive a low pressure fuel feed and increase the pressure of the fuel up to as much as, for example, 300 MPa. High pressure pump 32 may be operably coupled to flow path 28 via a fuel line 36.

According to the exemplary embodiment shown in FIG. 1, low pressure pump 30 and/or high pressure pump 32 may be operatively coupled to engine 12 and may be driven, for example, via crankshaft 18, either directly or indirectly. For example, low pressure pump 30 and/or high pressure pump 32 may be operably coupled to crankshaft 18 in any manner known to those skilled in the art, such that rotation of crankshaft 18 will result in a corresponding driving rotation of low pressure pump 30 and/or high pressure pump 32. For example, a driveshaft 42 of high pressure pump 32 is shown in FIG. 1 as being operably coupled to crankshaft 18 via a gear train 44. It is contemplated, however, that low pressure pump 30 and/or high pressure pump 32 may alternatively be driven electrically, hydraulically, pneumatically, or in any other known manner. It is further contemplated that fuel system 20 may also include, for example, a mechanical fuel injector system and/or a hydraulic fuel injector system, where the pressure of the injected fuel is generated and/or enhanced within individual injectors, with or without the use of a high pressure source.

According to some embodiments, one or more filtering assemblies, such as, for example, a primary filter assembly 38 and/or a secondary filter assembly 40, may be disposed along fuel line 34 (e.g., in a series relationship, as shown), and may be configured to remove contaminates, such as water and/or particulate matter from the fuel. For example, primary filter assembly 38 may include a filter element (not shown) configured to remove water and/or relatively large particulate matter from fuel received from tank 22. According to some embodiments, secondary filter assembly 40 may include one or more filter elements configured to remove particulate matter from fuel that has not been removed via primary filter assembly 38 (e.g., relatively smaller particulate matter), as described in more detail below. For example, primary filter assembly 38 may include a filter media configured to remove non-fuel liquid (e.g., water) and/or about 10 micron-size and larger particles, and secondary filter assembly 40 may include a filter media configured to remove about 3 micron-size and larger particles.

Figure 2:
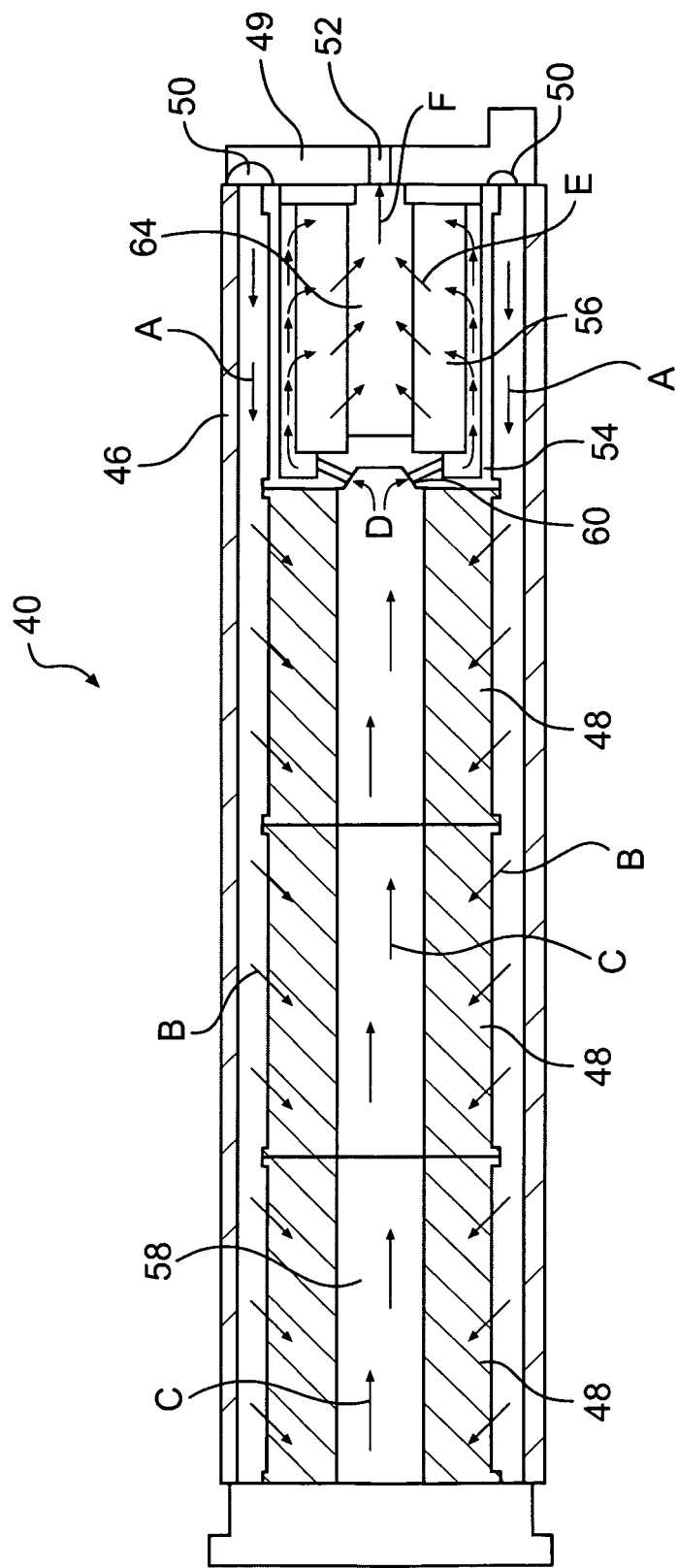
FIG. 2 is a schematic, cross-sectional illustration of an exemplary embodiment of a fuel filter assembly.

According to the exemplary embodiment shown in FIG. 2, secondary filter assembly 40 may include, for example, a housing 46, one or more filter elements 48, and one or more capsules 54 configured to receive one or more filter elements 56. Housing 46 may include a fuel system interface 49, defining an inlet port 50 and an outlet port 52. As shown in FIG. 2, exemplary secondary filter assembly 40 includes three filter elements 48 received in an end of housing 46 remote from inlet port 50 and outlet port 52. It is contemplated that secondary filter assembly 40 may be configured to receive a greater or lesser number of filter elements 48, and the filter elements 48 may be disposed in any suitable configuration, such as, for example, an axially-aligned configuration.

According to the exemplary embodiment shown in FIG. 2, secondary filter assembly 40 may be configured primarily to remove particulate matter from fuel that has not been removed via primary filter assembly 38. According to some embodiments, one or more filter elements 48 and filter element 56 may include a semi-permeable filter media configured to prevent particulate matter of relatively smaller particulate size from passing through secondary filter assembly 40 to fuel injectors 26.

As illustrated in FIG. 2, the exemplary embodiment of secondary filter assembly 40 may include housing 46 and capsule 54 configured to receive one or more filter elements 48 and 56, respectively. For example, filter element 48 and the second filter element 56 may be cylindrical in shape and may define hollow cylindrical cavities 58 and 64. As shown in FIG. 2, exemplary secondary filter assembly 40 includes one capsule 54. It is contemplated that housing 46 may include a greater number of capsules 54 (e.g., two capsules 54), and that capsules 54 may be disposed in any configuration, such as, for example, an axially-aligned configuration.

According to the exemplary embodiment shown in FIG. 2, low pressure pump 30 may direct a pressurized stream of fuel into housing 46 via inlet port 50. Housing 46 and capsule 54 define an annular flow path, which directs the flow of fuel around the outside of capsule 54 along arrow A, toward the end of housing 46 remote from inlet port 50. The fuel may then flow through one or more filter elements 48 as depicted by arrow B into a cavity 58 (e.g., a cylindrical cavity) defined by one or more filter elements 48, which capture particulate matter in the fuel (e.g., particulate matter not captured via primary filter assembly 38). Once the fuel enters cavity 58, it flows along arrow C toward capsule 54. As fuel reaches capsule 54, it enters capsule 54 at manifold 60, where the fuel is directed into capsule 54 via passages 62, as shown by arrow D. Once inside capsule 54, the fuel is directed to the exterior of filter element 56, and the fuel flows through filter element 56 as indicated by arrow E into cavity 64 (e.g., a cylindrical cavity) defined by filter element 56. From cavity 64, the fuel flows out outlet port 52 at arrow F into fuel line 34 (see FIG. 1). By virtue of capsule 54 diverting fuel to filter elements 48 and directing fuel into filter element 56, the fuel undergoes two passes through filtration media in a single housing, rather than a single pass through a filtration media, which would occur in filtration assemblies that do not include a capsule. According to some embodiments, secondary filter assembly 40 may include two capsules 54 (not shown) serially arranged at the end of housing 46 proximate inlet port 50 and outlet port 52, which would direct fuel such that the fuel would undergo three passes through filtration media within a single housing. The placement of more than two capsules 54 within a single housing 46 is contemplated.

Figure 3:
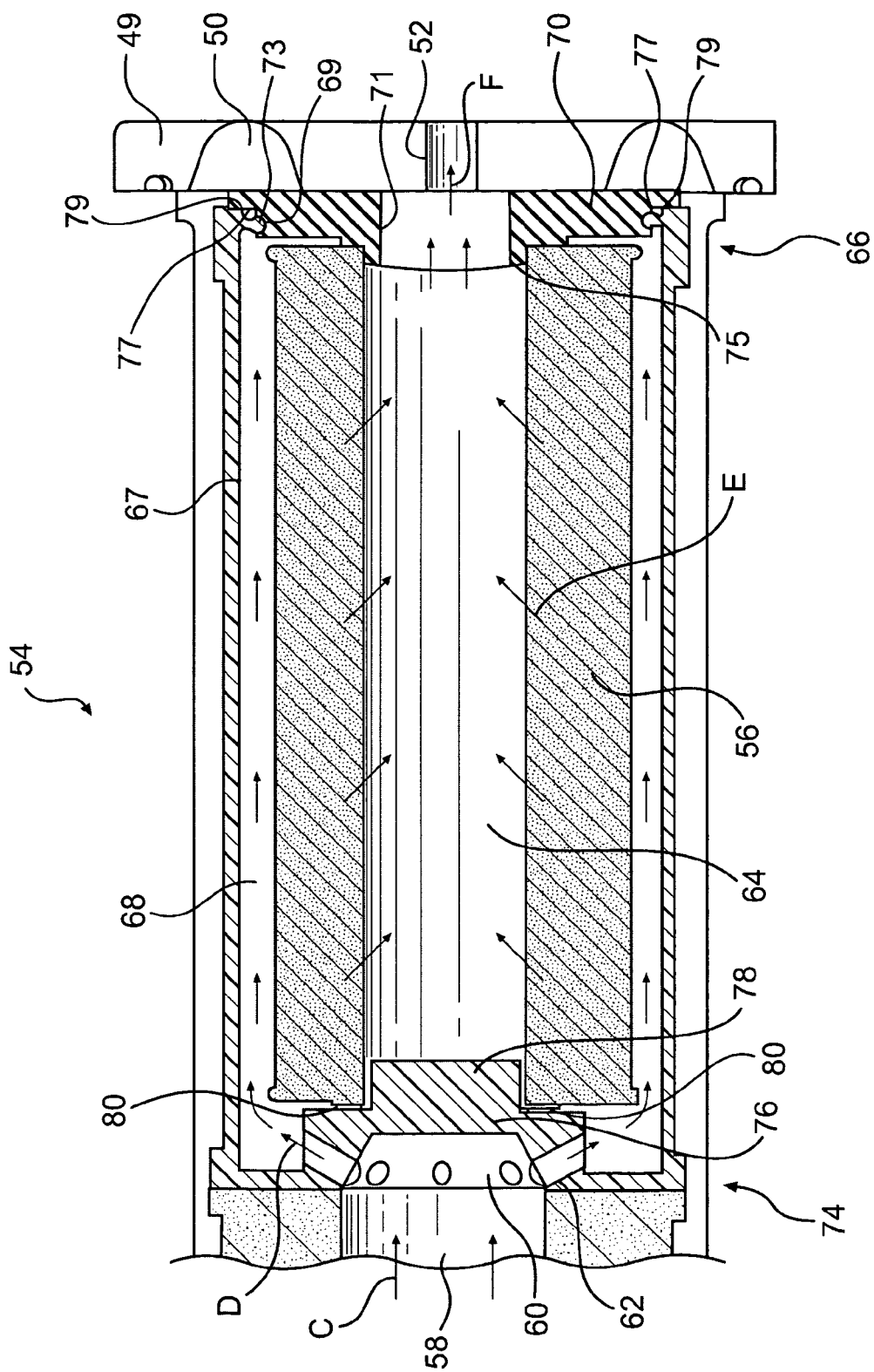
FIG. 3 is a schematic, cross-sectional illustration of a portion of the exemplary embodiment shown in FIG. 2.

According to the exemplary embodiment shown in FIG. 3, capsule 54 may include a tubular element 67 (e.g., a generally hollow cylindrical structure) defining an interior chamber 68 configured to receive a filter element (e.g., such as filter element 56). Exemplary capsule 54 is configured to be received at an end of housing 46 (see FIG. 2) proximate to inlet port 50 and outlet port 52 of fuel system interface 49.

According to some embodiments, a proximal end 66 of capsule 54 may include a cap 70 configured to retain filter element 56 within capsule 54. Cap 70 may include an orifice 71 configured to allow fuel to flow from cavity 64 to outlet port 52. According to some embodiments, cap 70 may be configured to be removable, thereby permitting access to chamber 68. For example, cap 70 may define a channel 69, and cap 70 may be operably coupled to tubular element 67 via cooperation with an extension 73 associated with proximal end 66 of tubular element 67 and channel 69, which may be configured to correspond to the shape of extension 73. According to some embodiments, cap 70 may include a surface 75 configured to axially align filter element 56 within chamber 68. The exemplary cap 70 also defines a recess 77 for receiving a sealing ring 79 configured to prevent fuel from leaking between tubular element 67 and cap 70.

A distal end 74 of capsule 54 may define manifold 60 (see also FIG. 2). According to the exemplary embodiment shown in FIG. 3, manifold 60 defines passages 62 and an end portion 76 configured to axially align filter element 56 within chamber 68. For example, end portion 76 may define a protruding surface 78 and may be axially aligned within interior chamber 68. End portion 76 may include a sealing ring 80 (or may be configured to receive sealing ring 80), which may prevent the flow of fuel entering interior chamber 68 from flowing into cavity 64 without passing through filter element 56 via the interface between end portion 76 and filter element 56. Filter element 56 may define a shape that generally corresponds to the shape of interior chamber 68, which is defined by tubular element 67, end portion 76, and surface 75 of cap 70.

INDUSTRIAL APPLICABILITY

The exemplary fuel filter assembly of the present disclosure may be applicable to a variety of power systems, such as, for example, compression-ignition engines, gasoline engines, gaseous-fuel-powered engines, and other internal combustion engines known in the art, where the reduction of exhaust emissions and/or improved fuel efficiency, among other things, may be desired. By virtue of using the disclosed fuel filter assembly in association with a power system, more precise control of fuel delivery may be achieved, thereby reducing exhaust emissions and/or increasing fuel efficiency. Operation of exemplary power systems provided with an exemplary fuel filter assembly will now be explained.

Referring to FIG. 1, a supply of fuel is drawn from tank 22 via pumping arrangement 24. In the disclosed example, low pressure pump 30 and high pressure pump 32 are disposed in series and are fluidly connected by way of fuel line 34. Low pressure pump 30 may include a transfer pump that provides a supply of fuel at relatively low pressure to high pressure pump 32. High pressure pump 32 may receive the low pressure fuel feed and further increase the pressure of the fuel. One or more filtering assemblies, such as primary filter assembly 38 and secondary filter assembly 40, may be disposed within fuel line 34 and serve to remove undesirable fluid and particulate matter from the fuel pressurized by pumping arrangement 24. For example, fuel is drawn by low pressure pump 30 through fuel filter assembly 38, where filter media removes fluid (e.g., water) and relatively large particulate matter from the fuel.

After flowing through primary filter assembly 38 and low pressure pump 30, the fuel enters secondary filter assembly 40, where the fuel undergoes additional filtration to remove particulate matter (e.g., relatively smaller particulate matter) that was not removed via primary filter assembly 38. Referring to FIG. 2, the fuel is received at inlet port 50 of secondary filter assembly 40, where the fuel is directed through an annular flow path defined by housing 46 and capsule 54 to one or more filter elements 48. Thereafter, the fuel flows radially inwardly through the filer media of filter elements 48, providing a first filtration of particulate matter within secondary filter assembly 40. The fuel then flows through cavity 58 defined by the one or more filter elements 48 to capsule 54. The fuel enters manifold 60 and flows through a plurality of passages 62 to the annular space defined by an inner surface of tubular element 67 and filter element 56. The fuel is then directed radially inwardly through filter element 56, where the fuel undergoes an additional filtration to remove particulate matter that was not removed via filter elements 48. The filtered fuel is then directed to outlet port 52 of secondary filter assembly 40, through high pressure pump 32 to flow path 28 (e.g., a fuel rail) via fuel line 36. The filtered fuel may then be supplied to combustion chambers 16 via fuel injectors 26, and the filtered fuel, along with air, may be ignited, thereby producing mechanical work.

The disclosed fuel filter assembly may provide a more complete removal of particulate matter from fuel and may provide relatively compact packaging for use in machine environments having relatively limited space. Specifically, directing fuel flow through multiple filter elements arranged in series within a single secondary filter housing may result in enhanced fuel filtration without requiring additional space. Utilized in conjunction with a primary fuel filter assembly, the fuel may be filtered at least three times prior to entering fuel injectors.

It will be apparent to those skilled in the art that various modifications and variations can be made to the disclosed, exemplary power systems and/or fuel filter assemblies. Other embodiments will be apparent to those skilled in the art from consideration of the specification and practice of the disclosed examples. It is intended that the specification and examples be considered as exemplary only, with a true scope being indicated by the following claims and their equivalents.

What is claimed is:

1. A capsule configured to direct fuel flow within a fuel filter assembly housing, the capsule comprising:
   a tubular element configured to define a flow path between the capsule and a fuel filter assembly housing, the tubular element defining
      an interior chamber,
      a proximal end, and
      a distal end defining a manifold,
   wherein the tubular element is configured to be removably received by the fuel filter assembly housing,
   wherein the interior chamber is configured to receive a fuel filter element,
   wherein the capsule is configured to direct fuel flow from the proximal end of the capsule around the tubular element to a point beyond the distal end of the capsule, and to receive fuel flow from the point beyond the distal end of the capsule and direct the fuel flow via the manifold to the filter element, thereby providing at least two filtering passes of the fuel flow through the fuel filter assembly housing, and
   a cap removably coupled to the proximal end of the tubular element, the cap including a central opening and a closed wall disposed outward of the central opening.

2. The capsule of claim 1, wherein the manifold defines a passage configured to direct the fuel flow to a space defined by an interior of the tubular element and a filter element received within the interior chamber.

3. The capsule of claim 1, wherein at least one of the proximal end and the distal end of the tubular element defines a surface configured to position a filter element in an axially-aligned manner within the interior chamber.

4. The capsule of claim 1, wherein the cap defines a surface configured to position the fuel filter element in an axially-aligned manner within the interior chamber.

5. The capsule of claim 1, further including a sealing member engaging the cap and the proximal end of the tubular element.

6. The capsule of claim 1, further including a sealing member operably coupled to a distal end of the interior chamber to engage the filter element to prevent the fuel flow from bypassing the filter element within the tubular element.

7. A capsule configured to direct fuel flow within a fuel filter assembly housing, the capsule comprising:
   a tubular element configured to define a flow path between the capsule and a fuel filter assembly housing, the tubular element defining
      an interior chamber,
      a proximal end, and
      a distal end defining a manifold, the manifold including at least one passage that extends at least partially radially outward from an opening in a central portion of the distal end,
   wherein the tubular element is configured to be removably received by the fuel filter assembly housing,
   wherein the interior chamber is configured to receive a fuel filter element, and
   wherein the capsule is configured to direct fuel flow from the proximal end of the capsule around the tubular element to a point beyond the distal end of the capsule, and to receive fuel flow from the point beyond the distal end of the capsule and direct the fuel flow via the manifold to the filter element, thereby providing at least two filtering passes of the fuel flow through the fuel filter assembly housing.

8. The capsule of claim 7, wherein the at least one passage of the manifold is configured to direct the fuel flow to a space defined by an interior of the tubular element and the filter element received within the interior chamber.

9. The capsule of claim 7, wherein at least one of the proximal end and the distal end of the tubular element defines a surface configured to position the filter element in an axially-aligned manner within the interior chamber.

10. The capsule of claim 7, further including a cap configured to be removably coupled to the tubular element.

11. The capsule of claim 10, wherein the cap defines a surface configured to position the fuel filter element in an axially-aligned manner within the interior chamber.

12. The capsule of claim 10, further including a sealing member engaging the cap and the proximal end of the tubular element.

13. The capsule of claim 7, further including a sealing member operably coupled to a distal end of the interior chamber to engage the filter element to prevent the fuel flow from bypassing the filter element within the tubular element.

14. A capsule configured to direct fuel flow within a fuel filter assembly housing, the capsule comprising:
   a tubular element configured to define a flow path between the capsule and a fuel filter assembly housing, the tubular element defining
      an interior chamber,
      a proximal end, and
      a distal end defining a manifold, the manifold including at least one passage that extends at least partially radially outward from an opening in a central portion of the distal end,
   wherein the tubular element is configured to be removably received by the fuel filter assembly housing,
   wherein the interior chamber is configured to receive a fuel filter element,
   wherein the capsule is configured to direct fuel flow from the proximal end of the capsule around the tubular element to a point beyond the distal end of the capsule, and to receive fuel flow from the point beyond the distal end of the capsule and direct the fuel flow via the manifold to the filter element, thereby providing at least two filtering passes of the fuel flow through the fuel filter assembly housing, and
   a sealing member disposed inside the interior chamber and operably coupled to a distal end of the interior chamber to engage the filter element to prevent the fuel flow from bypassing the filter element within the tubular element.

15. The capsule of claim 14, wherein the manifold defines a passage configured to direct the fuel flow to a space defined by an interior of the tubular element and the filter element received within the interior chamber.

16. The capsule of claim 14, wherein at least one of the proximal end and the distal end of the tubular element defines a surface configured to position the filter element in an axially-aligned manner within the interior chamber.

17. The capsule of claim 14, further including a cap configured to be removably coupled to the tubular element.

18. The capsule of claim 17, wherein the cap defines a surface configured to position a filter element in an axially-aligned manner within the interior chamber.

19. The capsule of claim 17, further including a sealing member engaging the cap and the proximal end of the tubular element.

* * * * *